United States Patent
Sasagaki

Patent Number: 5,978,605
Date of Patent: *Nov. 2, 1999

[54] FILM CARTRIDGE CONTROL DEVICE

[75] Inventor: Nobuaki Sasagaki, Yokohama, Japan

[73] Assignee: Nikon Corporation, Tokyo, Japan

[*] Notice: This patent issued on a continued prosecution application filed under 37 CFR 1.53(d), and is subject to the twenty year patent term provisions of 35 U.S.C. 154(a)(2).

[21] Appl. No.: 08/842,888

[22] Filed: Apr. 17, 1997

[30] Foreign Application Priority Data

Apr. 18, 1996 [JP] Japan .................................. 8-096547

[51] Int. Cl.⁶ .............................. G03B 7/00; G03B 7/24
[52] U.S. Cl. ........................................ 396/208; 396/284
[58] Field of Search ................................... 396/207, 208, 396/284, 285

[56] References Cited

U.S. PATENT DOCUMENTS

| | | | |
|---|---|---|---|
| 5,347,334 | 9/1994 | Smart et al. | 396/207 |
| 5,541,681 | 7/1996 | Cocca et al. | 396/207 |
| 5,548,359 | 8/1996 | Wakabayashi | 396/207 |
| 5,666,572 | 9/1997 | Tsuji et al. | 396/207 |

FOREIGN PATENT DOCUMENTS 7-199329  8/1995  Japan .

*Primary Examiner*—Safet Metjahic
*Assistant Examiner*—Michael Dalakis
*Attorney, Agent, or Firm*—Oliff & Berridge, PLC

[57] ABSTRACT

A film cartridge control device is provided for controlling a film cartridge provided with a data disk which rotates in association with a cartridge spool and indicates given information depending upon a position at which the data disk is stopped when a film is completely rewound in the film cartridge. The film cartridge control device includes a drive device that drives and rotates the cartridge spool, a control circuit that performs stop control for causing the drive device to stop the data disk at a predetermined position, and a storage circuit that stores stop control information that indicates that the stop control is being performed. The stop control information is set when the stop control is started and reset when the stop control is finished. The control circuit restarts the stop control after the cartridge spool is rotated by a predetermined amount by the drive device, if the stop control information is set in the storage circuit when the film cartridge control device is started.

10 Claims, 7 Drawing Sheets

FILM CARTRIDGE CONTROL DEVICE

INCORPORATION BY REFERENCE

The disclosure of the following priority application is herein incorporated by reference:

Japanese Patent Application No. 8-96547 filed Apr. 18, 1996.

BACKGROUND OF THE INVENTION

1. Field of the Invention

The present invention relates to a film cartridge control device, particularly used in a camera or the like, for stopping a data disk mounted on a film cartridge at a predetermined position.

2. Description of Related Art

There has been proposed a film cartridge provided with a data disk that rotates in association with a cartridge spool, wherein a position at which the data disk is stopped represents a condition of a film, e.g., whether the film has been exposed or unexposed (as disclosed in U.S. Pat. No. 5,347,334 that corresponds to Japanese Patent laid-open Publication No. 7-199329).

In a camera using the film cartridge as described above, the data disk is required to be stopped at a position that corresponds to the condition of the film, after the film is rewound into the cartridge.

Where a motor for driving/rotating the cartridge spool is rotated at a high speed when control of stopping the data disk at a given position is started, however, the motor overruns a different amount than that in the case where the motor is rotated at a low speed immediately after the motor is started, resulting in a variation in the position at which the data disk is stopped.

SUMMARY OF THE INVENTION

It is therefore an object of the present invention to provide a film cartridge control device, particularly used in a camera or the like, for accurately stopping a data disk of a film cartridge at a predetermined position.

To accomplish the above object, a film cartridge control device according to the present invention, for controlling a film cartridge provided with a data disk which rotates in association with a cartridge spool and indicates given information depending upon a position at which the data disk is stopped when a film is completely rewound in the film cartridge, comprises: a drive device that drives and rotates the cartridge spool; a control circuit that performs stop control for causing the drive device to stop the data disk at a predetermined position; and a storage circuit that stores stop control information that indicates that the stop control is being performed, the stop control information being set when the stop control is started and being reset when the stop control is finished; wherein the control circuit restarts the stop control after the cartridge spool is rotated by a predetermined amount by the drive device, if the stop control information is set in the storage circuit when the film cartridge control device is started.

DETAILED DESCRIPTION OF THE PREFERRED EMBODIMENTS

Figure 1:
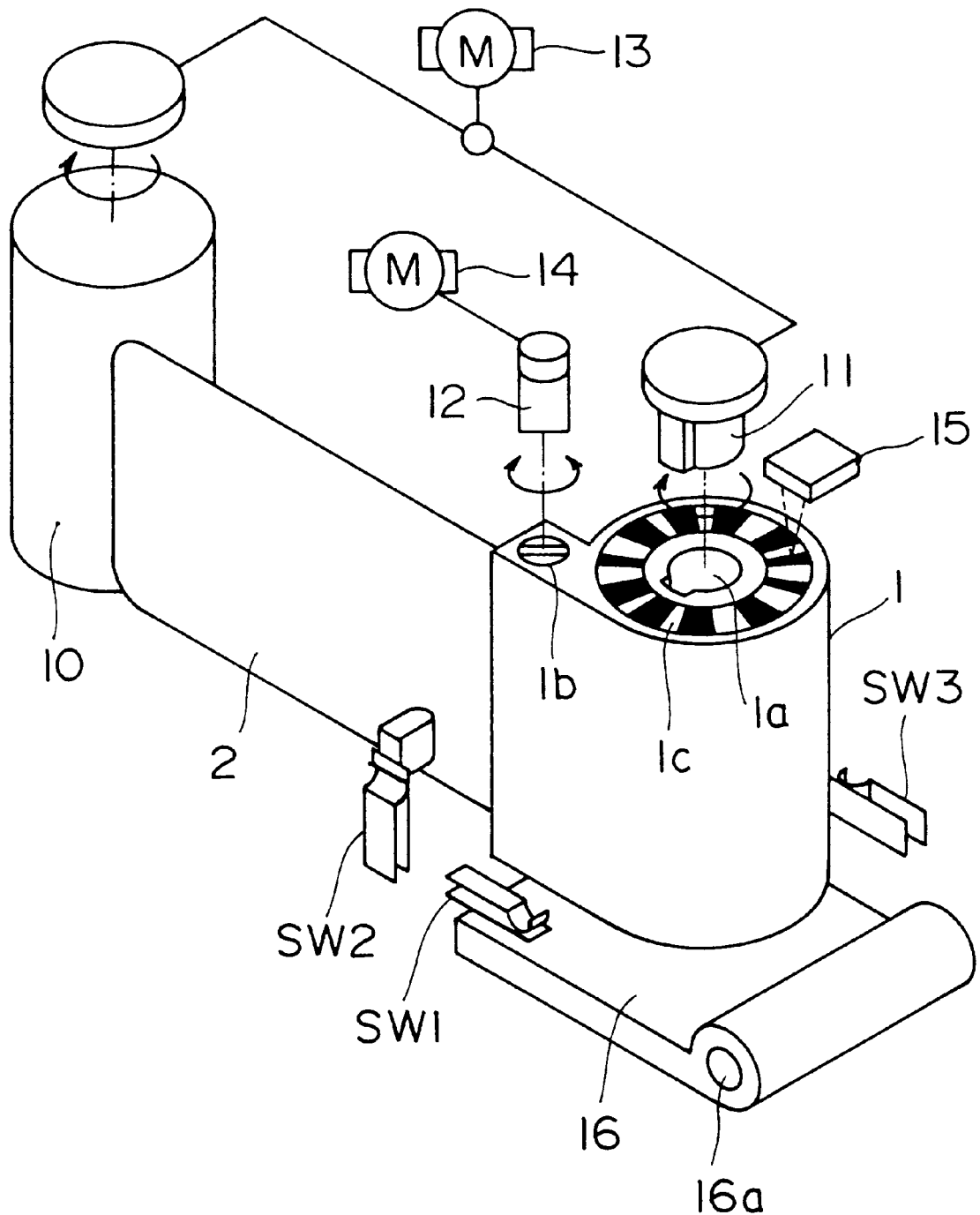
FIG. 1 is a view showing the construction of one embodiment of the present invention.

FIG. 1 shows the construction of one embodiment of the present invention.

Film cartridge 1 is provided with a data disk 1c that rotates in association with a cartridge spool 1a, and various kinds of information is imprinted or recorded in the form of a bar code pattern on the data disk 1c. The cartridge spool 1a is driven by a motor 13 through an engaging member 11, such that a film 2 is fed out of the cartridge 1 when the cartridge spool 1a is rotated in the direction of the arrow in FIG. 1, and the film 2 is rewound into the cartridge 1 when the spool 1a is rotated in the direction opposite the direction of the arrow in FIG. 1. The film cartridge 1 is also provided with a shielding door (not shown) at its exit through which the film 2 is rolled into and out of the cartridge 1. This shielding door is opened and closed by a motor 14 through an engaging member 12 that engages a drive shaft 1b of the shielding door. Takeup spool 10 of the camera is driven by the motor 13 and rotated in the direction of the arrow in FIG. 1, so as to wind up the film 2 on the camera.

Bar code read sensor 15 is an optical sensor, such as a photo interrupter, for reading the bar code pattern on the data disk 1c while it is being rotated. Cartridge lid switch SW1 is closed when a cartridge lid 16 is closed, and film detecting switch SW2 is closed when the film 2 is pulled out of the cartridge 1. Cartridge load detecting switch SW3 is closed when the cartridge 1 is loaded into a cartridge chamber. The cartridge lid 16 has a rotary shaft 16a.

Figure 2:
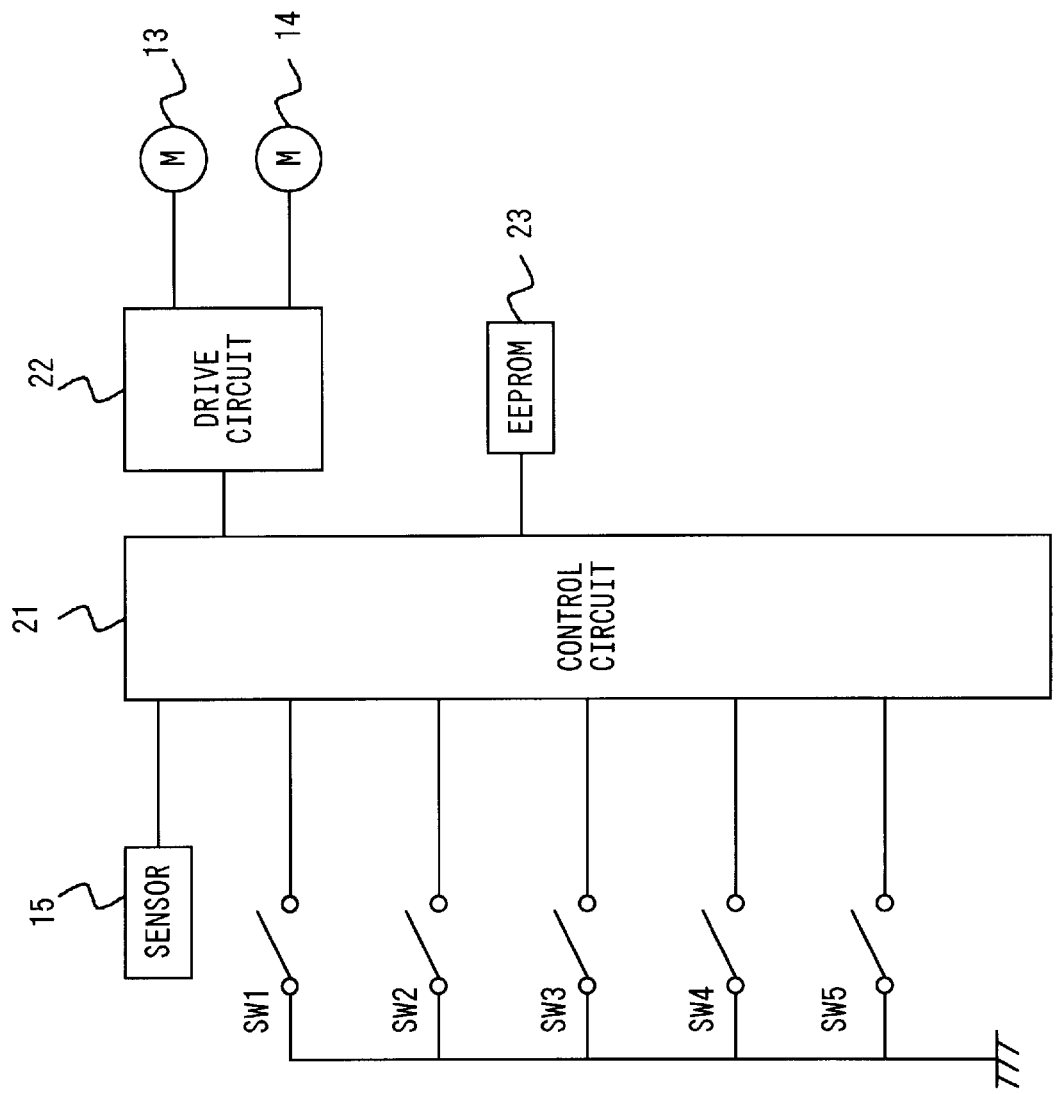
FIG. 2 is a view showing the construction of an electric circuit of the embodiment of FIG. 1.

FIG. 2 shows the construction of an electric circuit used in the above-indicated one embodiment of the present invention.

Control circuit 21 consists of a microcomputer and its peripheral components, and controls a drive circuit 22 based on information received from the bar code read sensor 15 and switches SW1–SW3, so as to drive the motors 13, 14. EEPROM 23 stores a flag that indicates that control of stopping data disk 1c is being performed for setting the data disk 1c at a given position. SW4 is a power supply switch, which is turned on so that electric power is supplied from a battery (not shown) to main portions of the camera. The control circuit 21 operates even by only loading of the battery. SW5 is a switch that is turned on by half-depressing a shutter release button (not shown).

FIG. 3 through FIG. 6 are flow charts showing routines executed by the microcomputer of the control circuit 21. The operation of the present embodiment will be explained referring to these flow charts.

Figure 3:
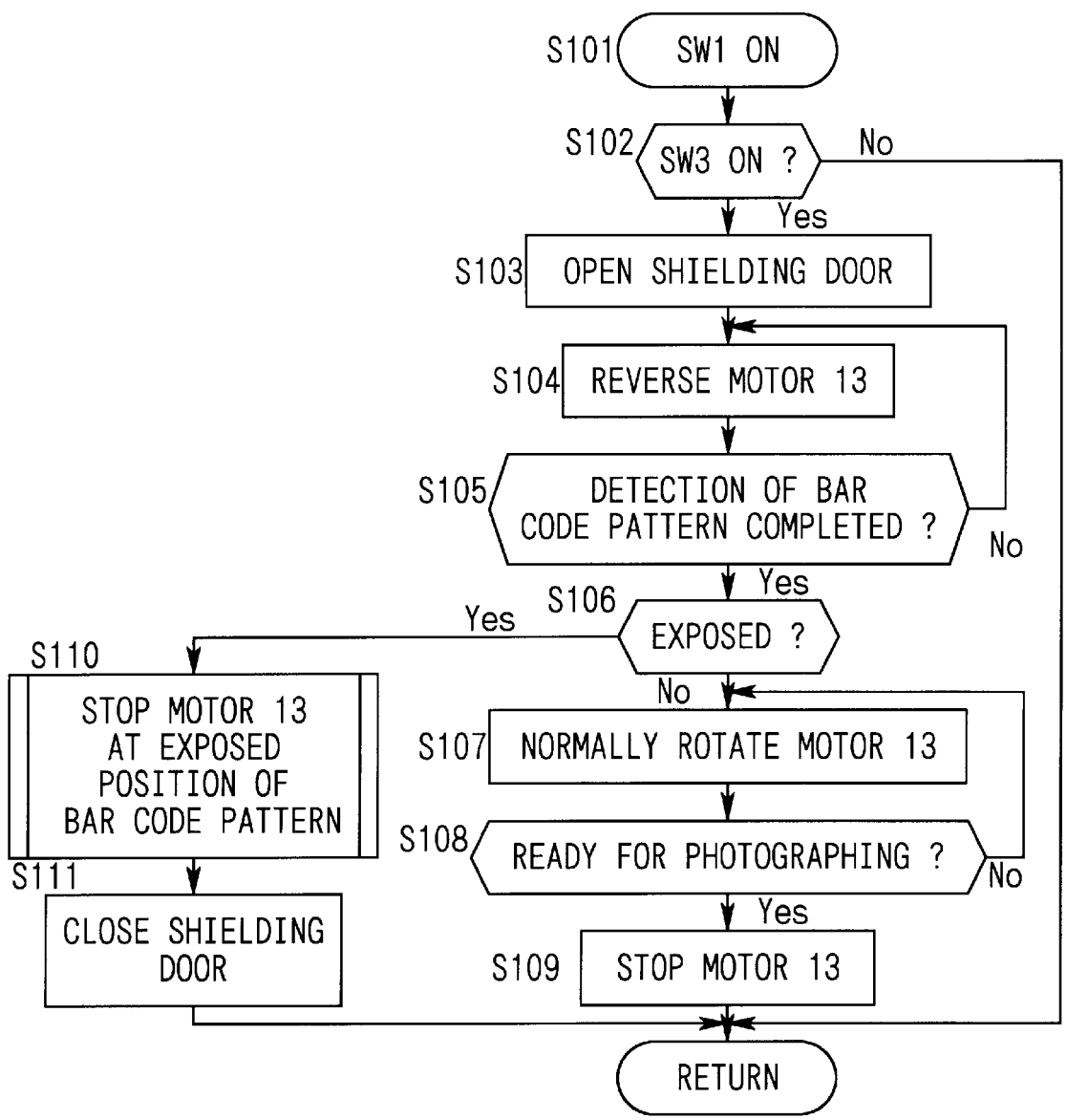
FIG. 3 is a flow chart showing a routine executed when a film cartridge is loaded into a camera.

FIG. 3 shows a routine executed upon loading of the film cartridge 1.

The microcomputer of the control circuit 21 initiates this routine in step S101 when it detects an ON (closed) state of the switch SW 1 which indicates that the cartridge lid 16 is closed. Step S102 determines by means of the switch SW3 whether the cartridge chamber is loaded with the film cartridge 1. The control flow goes to step S103 if the cartridge 1 is loaded, while the routine is terminated if the cartridge 1 is not loaded. In step S103, the control circuit 21 controls the drive circuit 22 to drive the motor 14 so as to open the shielding door. Step S104 is then executed to drive the motor 13 to rotate the cartridge spool 1a in the direction opposite the direction of the arrow in FIG. 1. At the same time, the data disk 1c is rotated in the direction opposite the direction of the arrow. During the rotation of the data disk 1c, the initial position and contents of the bar code pattern are detected by the bar code read sensor 15. When the detection of the bar code pattern is completed in step S105, step S106 is then executed to determine whether the film that is currently loaded in the camera has been exposed or not, based on the result of detection of the initial position of the bar code pattern. The control flow goes to step S110 if the film has been exposed, and goes to step S107 if the film has not been exposed.

Where the film 2 of the cartridge 1 that is loaded in the camera has not been exposed, step S107 is executed to drive the motor 13 to rotate the cartridge spool 1a and the takeup spool 10 of the camera in the directions of the arrows in FIG. 1, so that the film 2 is fed or rolled out of the cartridge 1, and wound up on the camera by the takeup spool 10. It is then determined in step S108 whether the first frame of the film 2 has reached a predetermined film exposure position, and preparation for photographing has been completed. If the preparation for photographing has been completed, the control flow goes to step S109 to stop the motor 13.

Where the film 2 of the cartridge 1 that is loaded in the camera has been exposed, on the other hand, step S110 is executed to perform the stop control of the data disk 1c described later, in which the motor 13 is kept rotated in the opposite direction with the bar code pattern being read by the sensor 15, and the motor 13 is stopped when the bar code pattern reaches an exposed position that indicates that the film 2 has been exposed. In the stop control of the motor 13, the motor 13 is already rotated in the opposite direction at a steady rotating speed before the stop control of the data disk 1c is started, so that the motor 13 is brought to the stop control of the motor 13 from the state in which the motor 13 is rotated at the steady rotated speed. Step S111 is then executed to drive the motor 14 so as to close the shielding door of the cartridge 1.

Figure 4:
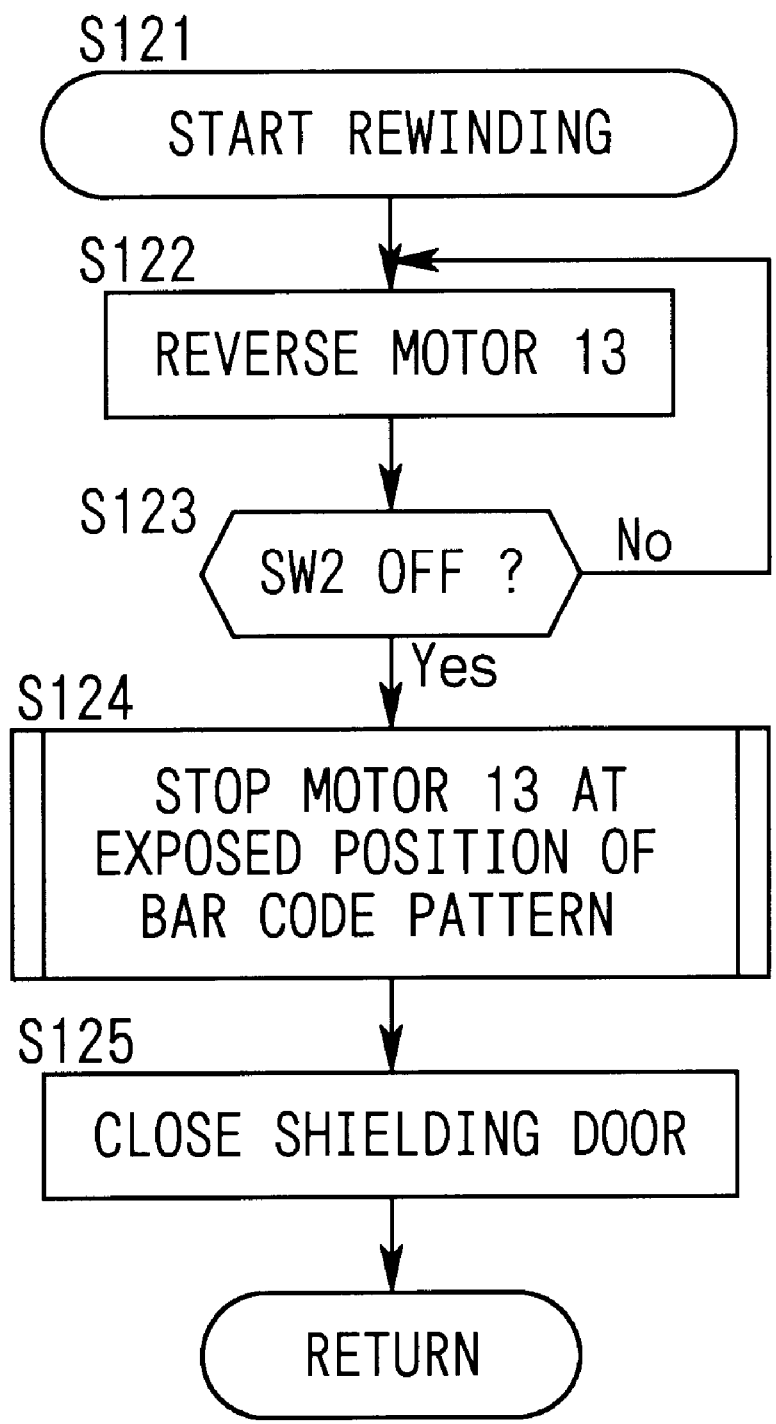
FIG. 4 is a flow chart showing a routine for rewinding a film.

FIG. 4 shows a routine for rewinding the film 2.

When the entire roll of the film 2 is wound up, or a rewinding button (not shown) is operated, the microcomputer of the control circuit 21 performs the film rewinding routine of FIG. 4. In step S122, the motor 13 is rotated in the direction opposite the direction of the arrow in FIG. 1, so as to rewind the film 2 into the cartridge 1. In step S123, it is confirmed by detecting the switch SW2 whether the rewinding of the film 2 has been completed or not, and, if the rewinding has been completed, the control flow proceeds to step S124. In step S124, the stop control of the data disk 1c described later is executed in which the motor 13 is kept rotated in the opposite direction with the bar code pattern being read by the sensor 15, and the motor 13 is stopped when the bar code pattern reaches the exposed position. In the stop control of the motor 13, the motor 13 is already rotated in the opposite direction at a steady rotating speed before the stop control of the data disk 1c is started, so that the motor 13 is brought to the stop control of the motor 13 from the state in which the motor 13 is rotated at the steady rotated speed. Step S125 is then executed to drive the motor 14 so as to close the shielding door of the cartridge 1.

Figure 5:
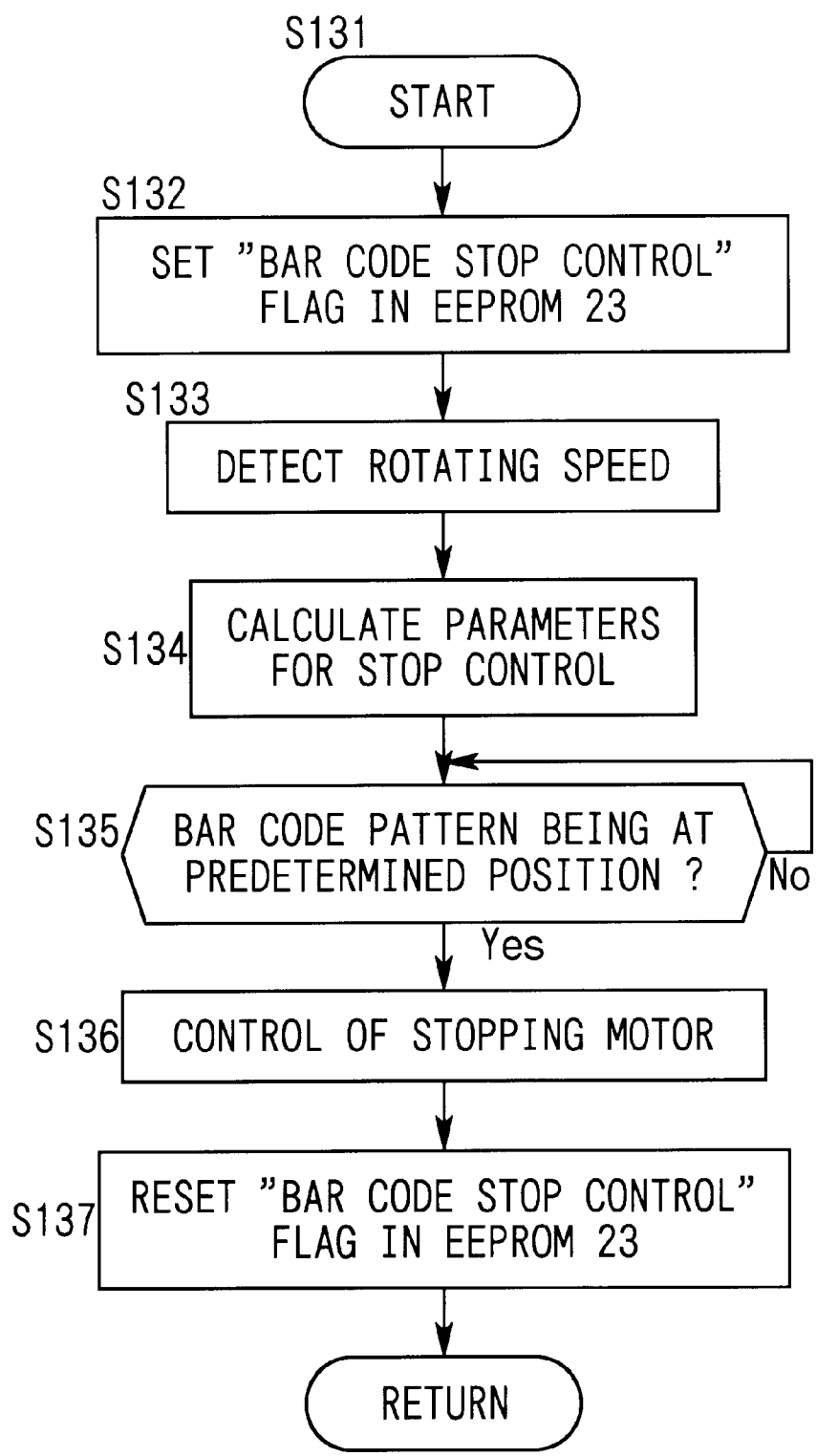
FIG. 5 is a flow chart showing stop control of stopping a data disk.

FIG. 5 shows the stop control of the data disk.

In step S132, "bar code stop control" flag indicating that the stop control of the data disk 1c is being performed is set in the EEPROM 23. In the following step S133, the rotating speed of the data disk 1c is detected by the bar code read sensor 15. In step S134, parameters, such as a reverse energizing (reverse supplying electric current) brake time and a short-circuit break time, used for the stop control of the motor 13 are calculated based on the rotating speed of the data disk 1c. It is then confirmed in step S135 whether the bar code pattern has reached a predetermined position, such as the above-described exposed position. If the bar code pattern reaches the predetermined position, step S136 is then executed to conduct the stop control of the motor 13 based on the calculated parameters. When the motor 13 is stopped, step S137 is executed to reset the "bar code stop control" flag that has been set in the EEPROM 23.

In the above-described stop control of the data disk 1c, the "stop control" flag is set before the stop control of the motor 13 is started, and the same flag is reset upon completion of the stop control of the motor 13. Thus, where the operation of the camera is stopped for some reason during the stop control of the data disk 1c, and the stop control of the data disk 1c is not finished yet, the "stop control" flag is kept being set in the EEPROM 23. Namely, the flag represents a state in which the stop control of the data disk 1c has not been finished.

In the stop control of the motor 13 as described above, the motor 13 is already rotated in the opposite direction at the steady rotating speed before the stop control of the motor 13 is started. However, in the case where the motor 13 is stopped with the battery used up or removed from the camera immediately before the stop control of the motor 13 is started, the stop control of the motor 13 will be performed immediately after the power is resumed by replacing the battery with another one. In this case, since the stop control of the motor 13 is started immediately after the motor 13 starts being driven in the direction opposite that of the arrow in FIG. 1, the stop control of the motor 13 is performed based on the parameters determined based on the steady rotating speed, before the motor 13 reaches the steady rotating speed. As a result, an overrun amount of the motor 13 after the start of this stop control of the motor 13 is reduced as compared with the case where the motor 13 is brought to the stop control of the motor 13 from the state in which the motor 13 is rotated at the steady rotated speed. In this case, the data disk 1c is stopped at a position that deviates from the predetermined exposed position.

Figure 6:
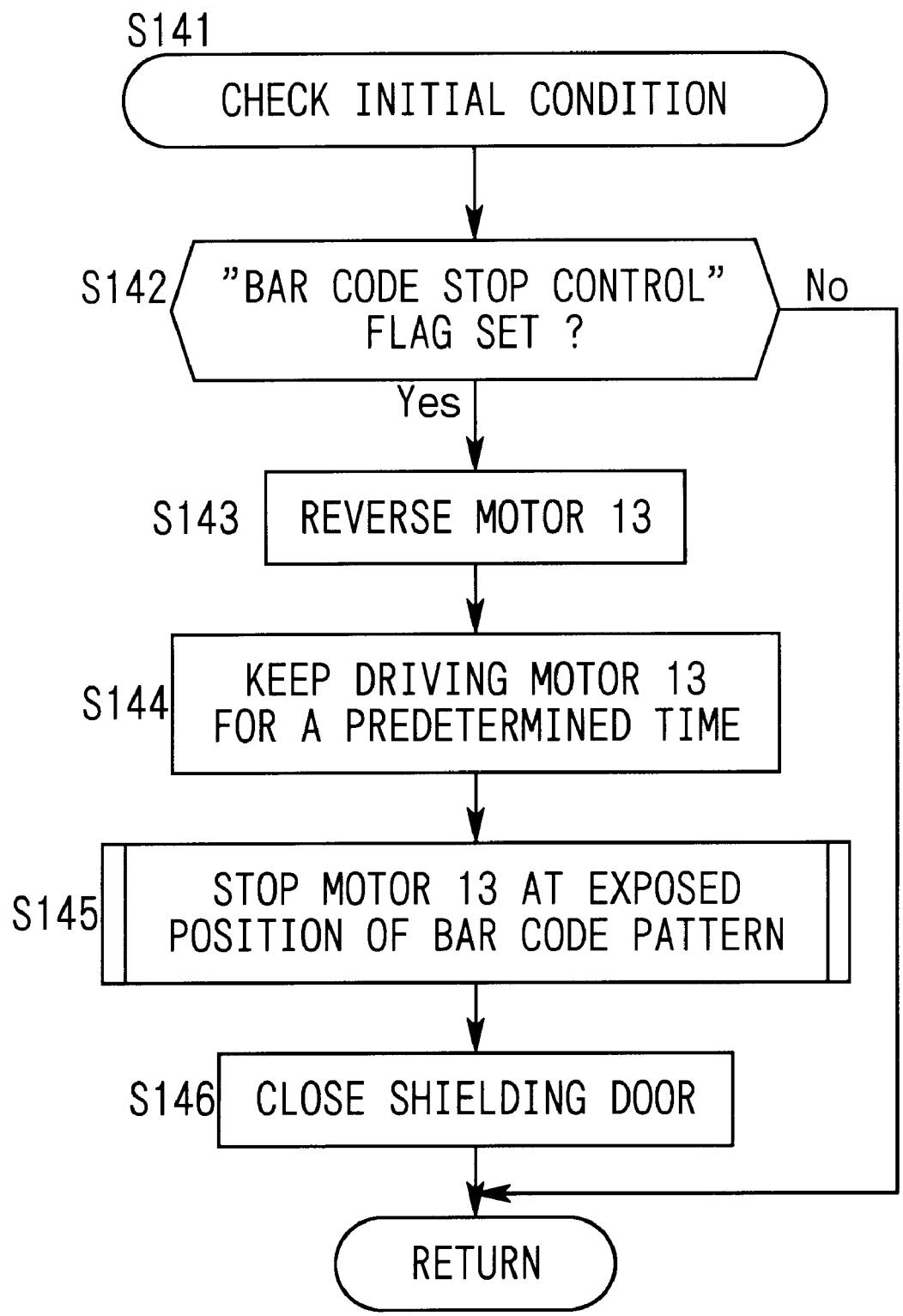
FIG. 6 is a flow chart showing stop control of stopping the data disk after a battery is replaced by another one.

In view of the above situation, the routine as shown in FIG. 6 is executed in this embodiment, in which where the motor 13 is stopped before the stop control of the motor 13 is performed, the motor 13 is driven in the opposite direction for a predetermined time after it is started, and then the stop control of the data disk c is restarted, that is, then the stop control of the motor 13 is initiated.

If the power supply switch SW4 is operated or the switch SW5 is operated by half-depressing the shutter release button after the battery of the camera is replaced by another one and the power supply is resumed, the microcomputer of the control circuit 21 executes a routine of checking the initial condition as shown in FIG. 6. Step S142 then determines whether the "bar code stop control" flag is set in the EEPROM 23 or not, and, if the flag is set, the control flow goes to step S143. If the flag is not set, the routine is terminated. After the motor 13 starts being driven in the direction opposite that of the arrow in FIG. 1 in step S143, step S144 is then executed to continue driving of the motor 13 for a predetermined time, until the motor 13 reaches the steady rotating speed. This predetermined time is set to be larger than a mechanical time constant of the motor 13 and its drive mechanism.

If the motor 13 reaches the steady rotating speed upon a lapse of the predetermined time, step S145 is then executed to perform the stop control of the data disk 1c as shown in FIG. 5, to drive the motor 13 while reading the bar code pattern with the sensor 15, and stop the motor 13 when the bar code pattern reaches the exposed position. Thereafter, step S146 is executed to drive the motor 14 to close the shielding door.

Figure 7:
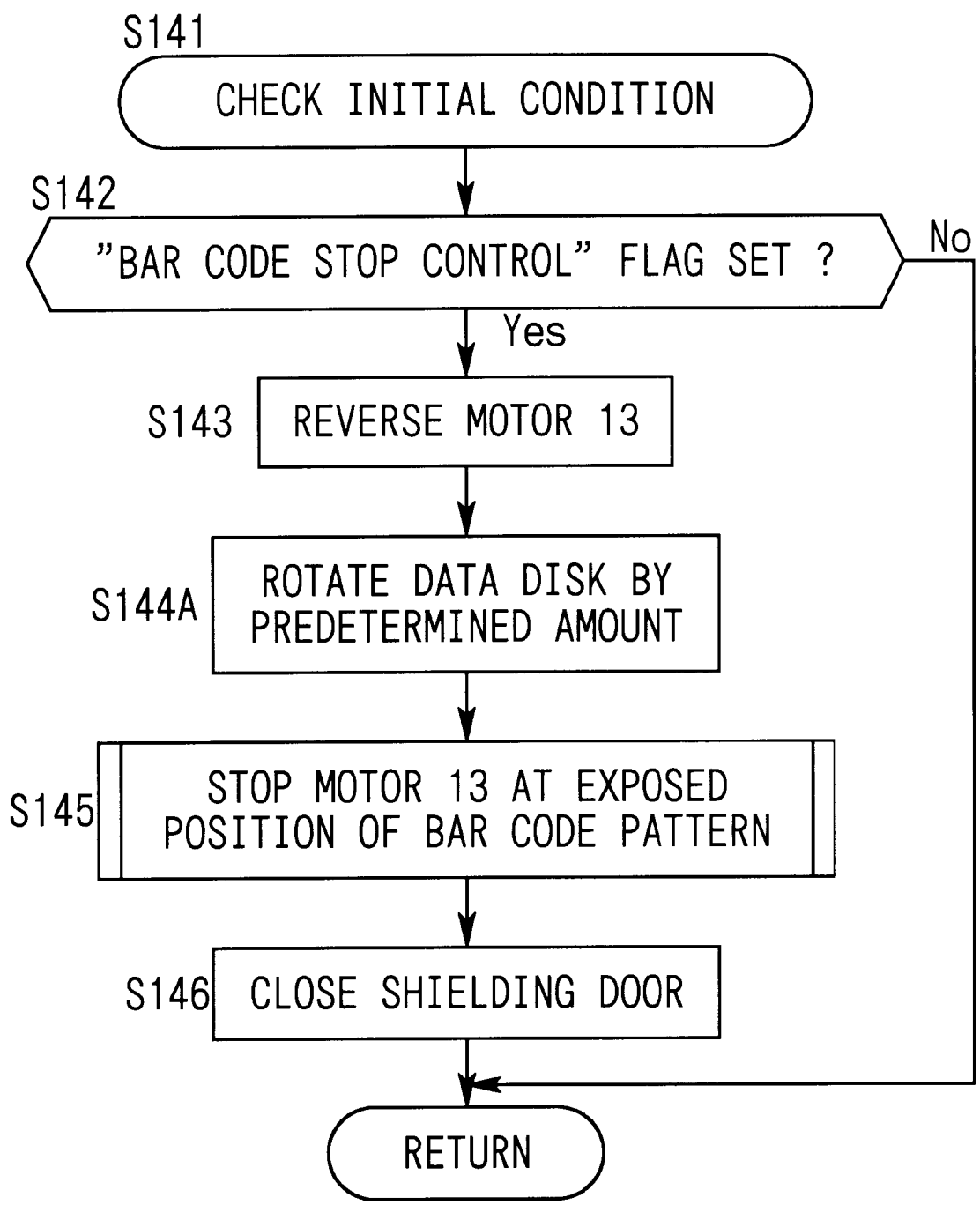
FIG. 7 is a flow chart showing another example of the stop control of stopping the data disk after the battery is replaced by another one.

In the present embodiment, the motor 13 is kept driven for the predetermined time until the motor 13 reaches the steady rotating speed. It is however possible to detect the rotating amount of the data disk 1c by means of the bar code read sensor 15 and the control circuit 21, and drive the motor 13 by a predetermined rotating amount until the motor 13 reaches the steady rotating speed. In this case, the predetermined rotating amount is set to an optimum value obtained by preliminary measurements. FIG. 7 is a flow chart showing this control. The flow chart of FIG. 7 is only different from that of FIG. 6 in that step S144 of FIG. 6 is replaced by step S144A of FIG. 7. Thus, only step S144A will be described. In step S144A, the bar code pattern is read by the bar code read sensor 15, and signals representing the pattern are fed from the sensor 15 to the control circuit 21 where the rotating amount of the data disk 1c is calculated. The control flow proceeds to step S145 when this rotating amount reaches the optimum value that is set as described above. The optimum value may be merely set to a value corresponding to one revolution of the data disk 1c.

As explained above, even where the motor 13 is stopped upon replacement of the battery of the camera, for example, and the routine of FIG. 5 is interrupted before the stop control of the motor 13 for setting the data disk 1c to the predetermined position is performed, the motor 13 is driven for the predetermined time or until the data disk 1c is rotated by the predetermined amount after it is started, and the stop control of motor 13 is then started when the motor reaches the steady rotating speed. In this case, the motor 13 is stopped after it overruns by substantially the same amount as in the normal stop control starting with the motor 13 rotated at the steady rotating speed, thereby enabling the data disk 1c to be accurately set to the predetermined position.

While the present invention is applied to a camera in the above-described embodiment, the application of the invention is not limited to cameras. For example, the present invention may be applied to an apparatus in which an image on a developed film is picked up and displayed on a monitor for enjoying the film contents. When a film cartridge as used in the above-described embodiment is used with such an apparatus, a data disk mounted on the film cartridge is required to be stopped at a position corresponding to the condition of the film after the film is operated and then rewound into the cartridge. Namely, the present invention is applicable to any apparatus which deals with a film cartridge having a data disk that rotates in association with a cartridge spool, wherein the data disk is required to be stopped at a position that corresponds to the condition of a film in the film cartridge.

What is claimed is:

1. A film cartridge control device for controlling a film cartridge provided with a data disk which rotates in association with a cartridge spool and indicates given information depending upon a position at which the data disk is stopped when a film is completely rewound in the film cartridge, comprising:

a drive device that drives and rotates the cartridge spool;

a control circuit that performs stop control for causing said drive device to stop the data disk at a predetermined position; and a storage circuit that stores stop control information that indicates that said stop control is being performed, said stop control information being set when the stop control is started and being reset when the stop control is finished; wherein said control circuit restarts said stop control after the cartridge spool is rotated by a predetermined amount by said drive device, if said stop control information is set in said storage circuit when the film cartridge control device is started, said predetermined amount depending upon a mechanical time constant of a rotational system of the drive device and being determined to stop the data disk accurately at the predetermined position.

2. A film cartridge control device according to claim 1, wherein said predetermined amount is an amount by which the cartridge spool is rotated so that a rotating speed of the cartridge spool reaches a steady rotating speed.

3. A film cartridge control device according to claim 1, wherein said control circuit defines said predetermined amount by causing said drive device to rotate the cartridge spool for a predetermined time.

4. A film cartridge control device according to claim 1, further comprising:

a rotating amount detector that detects a rotating amount of the data disk; and wherein said control circuit defines said predetermined amount based on the rotating amount detected by said rotating amount detector.

5. A film cartridge control device according to claim 1, wherein said storage circuit comprises a non-volatile memory.

6. A film cartridge control device according to claim 1, wherein the film cartridge control device is started when electric power is supplied to the film cartridge control device and control of the film cartridge control device is started.

7. A film cartridge control device according to claim 1, further comprising:

a power supply switch; wherein the film cartridge control device is started when said power supply switch is turned on.

8. A film cartridge control device of a camera for controlling a film cartridge provided with a data disk which rotates in association with a cartridge spool and indicates given information depending upon a position at which the data disk is stopped when a film is completely rewound in the film cartridge, comprising:

a drive device that drives and rotates the cartridge spool;

a control circuit that performs stop control for causing said drive device to stop the data disk at a predetermined position; and a storage circuit that stores stop control information that indicates that said stop control is being performed, said stop control information being set when the stop control is started and being reset when the stop control is finished; wherein said control circuit restarts said stop control after the cartridge spool is rotated by a predetermined amount by said drive device, if said stop control information is set in said storage circuit when the camera is started, said predetermined amount depending upon a mechanical time constant of a rotational system of the drive device and being determined to stop the data disk accurately at the predetermined position.

9. A film cartridge control device according to claim 8, further comprising:

a power supply switch that is operated to supply electric power to main portions of the camera; wherein the film cartridge control device is started when said power supply switch is operated.

10. A film cartridge control device according to claim 8, further comprising a shutter release switch that is turned on when a shutter release button is half-depressed; wherein the camera is started when said shutter release switch is turned on.

* * * * *